No. 798,590. PATENTED SEPT. 5, 1905.
C. BAER.
BEAN HARVESTING MACHINE.
APPLICATION FILED JAN. 16, 1902.

2 SHEETS—SHEET 1.

Charles Baer, Inventor

Witnesses
Jas. F. McCathran
H. F. Shepard

By C. G. Siggers
Attorney

No. 798,590. PATENTED SEPT. 5, 1905.
C. BAER.
BEAN HARVESTING MACHINE.
APPLICATION FILED JAN. 16, 1902.

2 SHEETS—SHEET 2.

Charles Baer, Inventor

Witnesses
Jas. F. McCathran
H. J. Shepard

By C. G. Siggers, Attorney

UNITED STATES PATENT OFFICE.

CHARLES BAER, OF MENDON, MICHIGAN.

BEAN-HARVESTING MACHINE.

No. 798,590.  Specification of Letters Patent.  Patented Sept. 5, 1905.

Application filed January 16, 1902. Serial No. 90,079.

*To all whom it may concern:*

Be it known that I, CHARLES BAER, a citizen of the United States, residing at Mendon, in the county of St. Joseph and State of Michigan, have invented a new and useful Bean-Harvesting Machine, of which the following is a specification.

This invention relates to harvesting-machines, and has for its object to provide an improved machine of this character which is particularly adapted for harvesting beans.

It is furthermore designed to have the machine arranged to cut or dig up two rows of beans at a time, to guide or direct the dug-up plants toward the longitudinal center of the machine, to elevate said plants upwardly and over the rear end portion of the machine, and finally to dump or discharge the vines in bundles upon the ground in rear of the machine.

Further objects reside in providing for the vertical adjustment of the cutting-knives, so as to vary the depth of the cutting action thereof, according to the requirements of different plants, and also to have the knives out of action when the machine is traveling over roads or other fields, to provide for conveniently dumping the vines when a sufficient quantity thereof has been collected upon the rear of the machine to form a bundle of the desired size, and also to provide for throwing the machine out of gear whenever it may be desired to stop the elevator.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
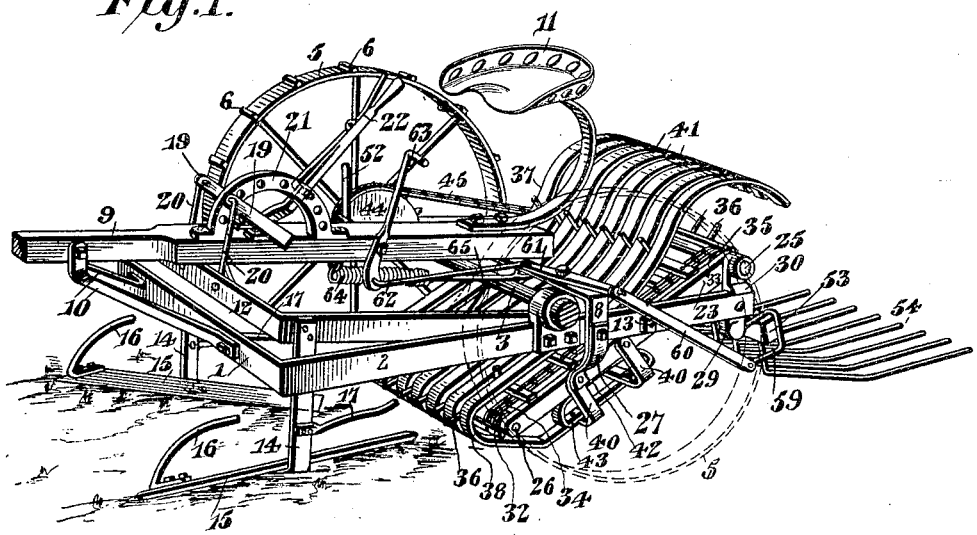
Figure 4:
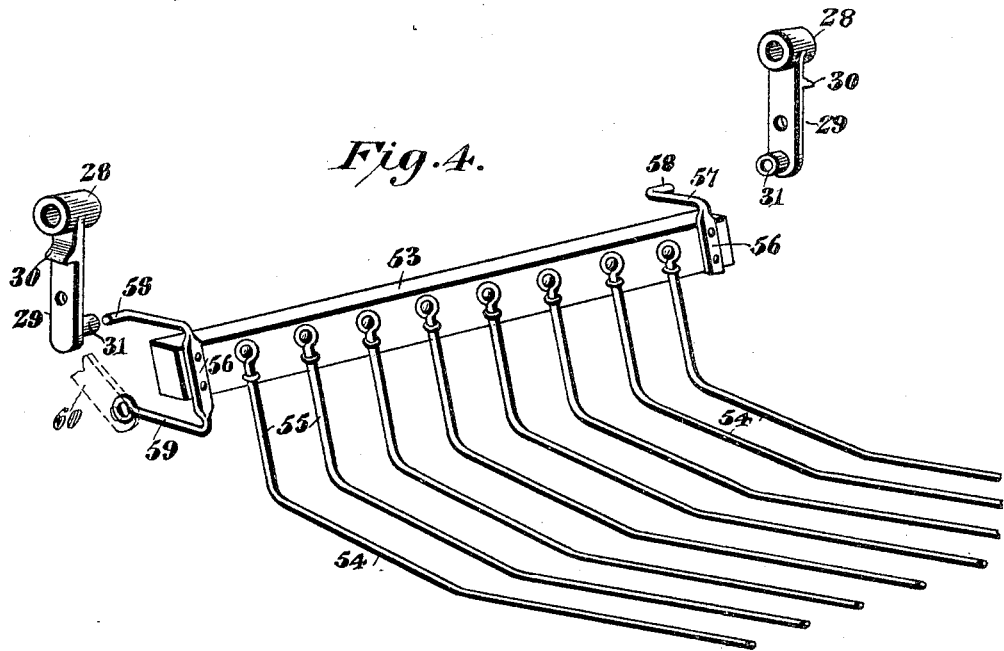
Figure 2:
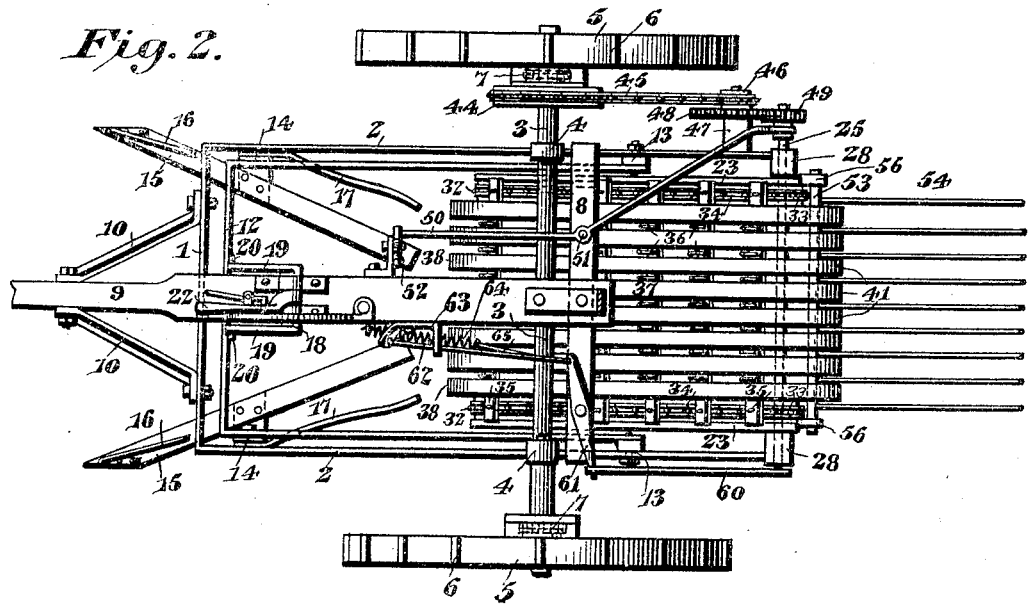
Figure 3:
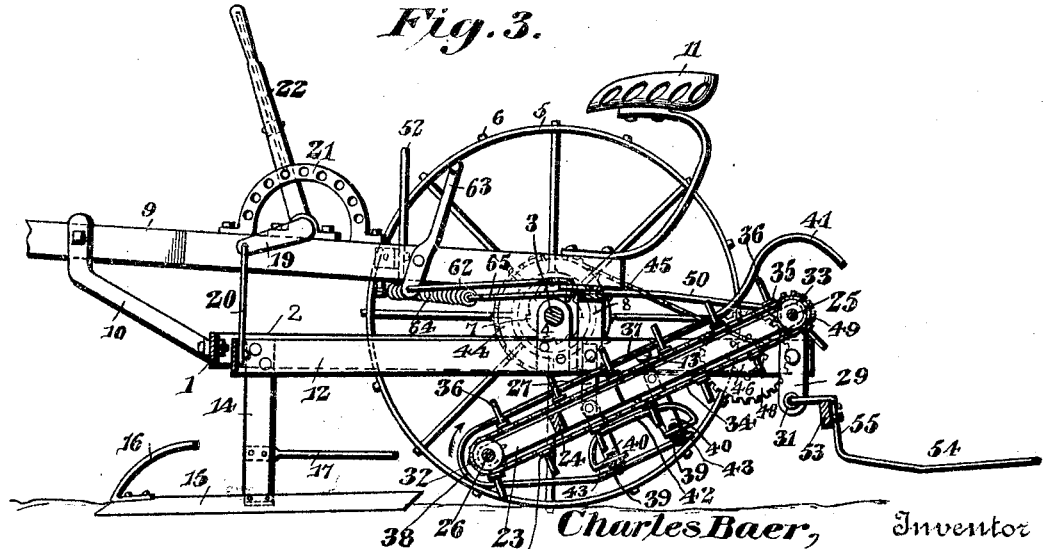

In the drawings, Figure 1 is a perspective view of a bean-harvester constructed and arranged in accordance with the present invention. Fig. 2 is a top plan view thereof. Fig. 3 is a longitudinal sectional view. Fig. 4 is an enlarged detail perspective view showing the bundle carrier and dumper.

Like characters of reference designate corresponding parts in all the figures of the drawings.

In carrying out the present invention there is provided a substantially rectangular metallic main frame comprising a front end bar 1 and opposite longitudinal side bars 2, the rear ends of which are not connected by a rear end bar. Across the rear portion of this main frame is an axle 3, journaled in suitable bearings 4, carried by the sides of the frame and also provided at opposite ends with suitable supporting-wheels 5, having broad rims to prevent sinking of the wheels into the ground, and also having transverse ribs or projections 6 to prevent slipping of the wheels upon damp or wet soil. As indicated by the dotted lines at 7, it will be understood that each wheel is provided with a ratchet mechanism, so that the wheel may rotate loosely in a rearward direction. An arched brace 8 connects the opposite sides of the frame and is located adjacent to and in rear of the axle, and a tongue or draw-bar 9 projects a suitable distance in front of the machine and is connected to the front end bar 1 by means of the brackets or braces 10 and also bolted or otherwise secured to the arched brace-bar 8, whereby the tongue is elevated a suitable distance above the top of the main frame. The usual driver's seat 11 is supported upon the rear end of the tongue.

Within the main frame and below the tongue or draw-bar there is provided a supplemental or knife frame 12, which embodies a front end bar and opposite side bars and has the rear ends of its side bars pivotally connected to the respective sides of the main frame, as indicated at 13, slightly in rear of the arched brace-bar 8, whereby this frame is adapted to swing or rock vertically upon the pivotal supports 13. At each front corner of this supplemental frame there is provided a standard or hanger 14, which depends from the frame and is provided at its lower end with a knife-blade 15, which projects in front and rear of the front end bar of the main frame and is inclined inwardly and rearwardly, whereby the opposite knife-blades diverge forwardly, the forward ends thereof being separated by a space sufficient to take in two rows of bean-vines, and by reason of the rearward convergence of the blades the latter form guides to direct the cut vines toward the center of the machine, so that they may afterward be effectually taken up by the elevator, as will be hereinafter explained. Each blade is also tilted laterally in an inward and downward direction and has its inner edge formed into a cutting edge. From the front of each blade rises a guard or fender 16, preferably in the form of a metal rod which is bowed upwardly and rearwardly, so as to prevent the vines from falling over upon the outer side of the knife-blade and also to prevent the cut vines from becoming entangled with the adjacent hanger or standard 14. Another substantially horizontal guard or fender 17 has its forward end connected to the adjacent hanger or standard 14 and inclines inwardly and rearwardly, so as to aid in directing the cut vines toward the center of the machine. By this arrangement of cutting-knives and guards it will be seen that the cut vines are effectually gathered inwardly, so as to finally merge into a single continuous row of cut vines for convenience in being taken up by the elevator.

For raising and lowering the knife-frame there is provided a rock-bar 18, which is mounted transversely across the top of the tongue or draw-bar 9 and slightly in rear of the front end of the main frame, the opposite ends of the rock-bar being provided with forwardly-directed crank-arms 19, from the outer ends of which depend links 20, which are connected in any suitable manner to the front end bar of the knife-frame 12. An arcuate rack-bar 21 is supported upon the top of the tongue and straddles the rock-bar 18, and a suitable ratchet-lever 22 is connected to the rock-bar and is in operative relation to the rack-bar 21. It will of course be understood that the ratchet-lever 22 is in position for convenient manipulation from the driver's seat, whereby the knife-frame may be adjustably elevated, so as to vary the depth of the cut of the knives and also to raise the latter entirely out of engagement with the ground when the machine is not in operation.

In order that the cut vines may be gathered up and discharged over the rear end of the machine, there is provided an elevator for carrying out this object and embodying a frame comprising opposite side bars 23, which are connected by an intermediate cross-bar 24, as best illustrated in Fig. 3 of the drawings, the opposite ends of the side bars being connected by the upper and lower shafts 25 and 26, respectively, the frame being located within the rear portion of the main frame projected in front of the axle and terminated adjacent to the rear ends of the knife-blades and also inclined upwardly and rearwardly to the extreme end of the machine. The forward portion of this elevator-frame is hung from the main frame by means of suitable brackets, one of which has been illustrated at 27 in Fig. 1 of the drawings and the opposite corresponding bracket being indicated by the same numeral in Fig. 3 of the drawings. The upper or rear shaft 25 is projected at opposite sides of the elevator-frame, and each end of this shaft is journaled in a tubular socket or bearing 28, which is formed transversely upon the top of a bracket 29, which is secured to the rear end of the adjacent side of the main frame, said bracket having a transverse ledge or shoulder 30 lying against the top of the side bar, so as to prevent swinging movements of the bracket, and the lower end of this bracket projects below the main frame and is provided with a transversely-disposed tubular bearing-socket 31. Sprocket-wheels 33 and 32, respectively, are provided upon the shafts 25 and 26, and over the corresponding sprocket-wheels travel the sprocket-chains 34 of an endless elevator, which embodies a plurality of slats or cross-bars 35, connected at opposite ends to the chains and provided with laterally-projected pins or fingers 36. Immediately above the elevator-frame and extending parallel therewith is a plurality of spaced flat guard slats or members 37, between which work the fingers or pins upon the upper side of the elevator, said fingers or pins being projected a suitable distance above the guard-slats, so as to carry the vines upwardly across the slotted table formed by the guard members. The lower ends of the guard members are bowed downwardly and rearwardly, as at 38, so as to pass around and rearwardly beneath the lower elevator-shaft 26 and have their extremities connected to a pair of cross-bars 39, which lie transversely beneath the elevator-frame and have their opposite ends connected to the sides of said frame by means of suitable brackets or hangers 40, which form the sole supports for said guard members. The upper and rear ends of the guard members are bowed upwardly and rearwardly, as indicated at 41, so as to clear the upper teeth or pins of the endless conveyer or elevator and also to project over and in rear of the shafts 25, whereby the vines may be carried over the rear end of the machine without interfering with the shaft 25.

To prevent the fingers or pins 36 from striking the cross-bars 39 should the chains of the elevator become slack, there is provided at each side of the elevator an upwardly-bowed guide or guard 42, consisting of a bowed or arcuate spring strap or plate having its opposite ends extended inwardly in opposite directions and secured to the respective cross-bars 39, as indicated at 43, and located in the path of the slats of the elevator, whereby said slats are raised by the guard or guide, so as to elevate the pins above the cross-bars 39, and thereby prevent said pins from engaging with the cross-bars and interfering with the movement of the elevator.

The elevator is driven from the wheeled shaft of the machine by means of a sprocket-wheel 44, carried by one end portion of the shaft and provided with a sprocket-chain 45, running over a sprocket-wheel 46, mounted upon a bracket 47, which is projected outwardly from the adjacent side of the main frame. The stub-shaft upon which the small sprocket-wheel 46 is mounted also carries a large gear 48, which is in mesh with a smaller pinion 49, carried by the adjacent end of the rear shaft 25 of the elevator.

To throw the elevator into and out of operation, the pinion 49 is mounted to slide upon the shaft 25, so as to be thrown out of mesh with the gear 48, thereby to stop the movement of the elevator. For controlling the slidable movement of the pinion 49 there is provided a two-membered shifting-lever 50, which is fulcrumed at an intermediate point upon the arched brace 8, as indicated at 51, the rear end of the lever being connected to the hub of the pinion in any suitable manner, so as not to interfere with the rotation thereof, and the forward end of the lever being connected to an upstanding controlling-lever 52, which is fulcrumed upon the tongue 9 in front of and in convenient reach from the driver's seat.

It will of course be understood that the elevator travels in the direction indicated by the arrow shown in Fig. 3 of the drawings, whereby the vines which have been dug up by the knives are engaged by the fingers of the elevator and carried upwardly and rearwardly over the slotted table formed by the slats or guards 37 and finally discharged over the rear of the frame. It will now be understood that the rear end of the slotted table is bowed upwardly to clear the rearmost fingers of the elevator in order that the vines may not be pulled inwardly into the slots or spaces between the guard members 37.

In order that the vines may be collected in bundles of considerable size, there is provided a combined bundle carrier and dumper in the form of a fork located in rear of the machine and comprising a cross-head 53 and a plurality of rod-like tines or fingers 54, which have their inner ends extended downwardly, as indicated at 55, and then bent outwardly and rearwardly, so as to form a basket to hold the vines after they have been discharged from the rear end of the elevator. Each end of the cross-head 53 is provided with a hinge-bracket 56, which is provided in its upper end with an arm or member 57, projected in front of the cross-head and having a front terminal outwardly-directed pin or projection 58, forming a pivot-stud, which is normally supported in the bearing-socket 31, carried by the adjacent bracket 29 upon the rear end of the main frame, whereby the carrier is capable of a vertical rocking or tilting movement. For controlling the movement of the carrier the hinge-bracket 56, which is opposite the drive connections for the elevator, is provided at its lower end with a forwardly-directed arm 59, which projects in front of the cross-head 53 and is connected to the rear end of a link or connecting-bar 60, which inclines upwardly and forwardly and has its upper end connected to a rock-lever 61, fulcrumed intermediate of its ends upon the top of the arched brace 8, the inner end of said lever having a connecting rod or link 62, which is connected to the lower end of a foot-lever 63, fulcrumed intermediately upon the adjacent side of the tongue 9 and in position for convenient manipulation from the driver's seat. A helical spring 64 has its forward end connected to the under side of the tongue and its rear end connected to the inner end of the rocking lever 61 by means of a link or other suitable connection 65, the purpose of said spring being to normally hold the bundle-carrier in a substantially horizontal position, so as to receive the vines as they pass over the rear end of the machine. By forcing the upper end of the lever 63 in a forward direction the outer end of the rocking lever 61 will be moved forwardly, thereby drawing upon the connecting-rod 60, and thus tilting or swinging the bundle-carrier in a downward position upon its journals 58, thereby to tilt the carrier downwardly and rearwardly for the purpose of dumping the bundle of vines collected thereon. By this means the cut vines may be conveniently collected into bundles of suitable size and separately dropped upon the ground for convenience in afterward gathering them up instead of strewing the vines in a continuous line in rear of the machine.

The machine operates in the following manner: The knife-frame and knives are adjusted by means of the lever 22 to cut at the desired depth below the surface of the ground, and as the machine moves forward these knives will operate with a drawing cut to scrape or dig the vines from the ground without leaving any standing stalks. By reason of the rearward convergence of the knives and the guards thereof the two rows of cut vines are gathered inwardly toward the longitudinal center of the machine, after which they are engaged by the fingers of the elevator and carried upwardly and rearwardly over the slotted table thereof until they are finally dropped upon the carrier at the extreme rear of the machine, where they remain until a bundle of sufficient size has been collected, and then the carrier is tilted downwardly in the manner hereinbefore described, so as to dump or discharge the bundle of vines to the ground.

From the foregoing description it is apparent that the present machine is arranged to cut or dig up two rows of vines at a time, to gather the cut vines to the longitudinal center of the machine, so that they may be effectually acted upon by the elevator to carry the vines upwardly and over the rear end of the machine, and to finally collect the vines in a bundle, which may ultimately be dropped or discharged to the ground. Furthermore, these several operations are carried out in a simple and convenient manner, as the cutting-knives are stationary with respect to the frame of the machine during the cutting operation, and it is the elevator only which has a continuous movement, whereby vibrations are reduced to the minimum and the machine is rendered strong and durable.

What I claim is—

1. In a harvesting-machine of the character described, the combination with opposite standards, of rearwardly-converging knife-blades carried by and projecting in front and rear of the standards and having inner longitudinal cutting edges, upwardly and rearwardly extended curved guards or fenders mounted on and carried by the forward ends of the blades, other guards or fenders carried by the standards and converging rearwardly therefrom, said last-mentioned guards or fenders being arranged in rear of the blades and spaced from the same, and conveying means of greater width than the distance between the rear ends of the blades for conveying the cut material upward from the ground.

2. In a harvesting-machine of the character described, the combination with an axle, and wheels, of a tongue secured at its rear end to the axle, a main frame secured to and extending forwardly from the axle and located beneath and connected with the tongue, a vertically-tilting frame hinged at its rear end to the axle and arranged to swing through the main frame, cutting mechanism rigidly mounted on and movable with the tilting frame and adapted to cut the vines from the ground, means mounted on the tongue and connected with the tilting frame for adjusting the same upon its hinged support, and a conveyer disposed in rear and independently of the vertically-tilting frame and mounted rigidly upon the main frame to carry away from the cutting apparatus the vines cut thereby.

3. In a harvesting-machine of the character described the combination with a main frame having an axle and wheels, and a draft-tongue supported above the main frame, of a vertically-tilting frame located below the tongue and hinged to the axle, a transversely-disposed rock-bar extending across the tongue and provided with opposite crank-arms, links connecting the crank-arms and the tilting frame, a lever carried by the rock-bar, means for securing the lever in its adjustment, cutting apparatus rigidly mounted on and movable with the tilting frame, and a conveyer disposed in rear and independent of the vertically-tilting frame and mounted rigidly upon the main frame to carry away from the cutting apparatus the vines cut thereby.

4. In a harvesting-machine of the character described, the combination with a frame, of cutting apparatus carried by the front portion thereof and provided with means for guiding the vines rearward, conveying means located in rear of the cutting apparatus, a bundle forming and discharging device comprising a transversely-disposed substantially horizontal rocking cross-head hinged to the rear portion of the frame adjacent to the rear end of the conveying means, and rearwardly-directed, substantially horizontal fingers carried by the cross-head, a controlling device mounted upon the frame of the machine, and a connection between the controlling device and the cross-head to rock the latter for vertically tilting the bundle-forming device.

5. In a harvesting-machine of the character described, the combination with a wheeled frame, of cutting apparatus carried by the front of the frame and adapted to guide the vines rearward, an upwardly and rearwardly inclined fingered conveyer located in rear of the cutting apparatus, a bundle forming and discharging device carried by the rear of the frame and disposed to receive the discharge from the conveyer, and upwardly and rearwardly inclined guard members lying above the conveyer at opposite sides of the respective fingers and arranged to lift the vines from the fingers to permit the vines to fall upon the bundle forming and discharging device.

6. In a harvesting-machine of the character described, the combination with cutting apparatus, means for guiding the vines rearward, an upwardly and rearwardly inclined fingered conveyer, a cross-bar carried by and hung from the conveyer, and guides carried by the cross-bar and located in the path of the lower section of the conveyer to carry the same over the cross-bar.

7. In a harvesting-machine of the character described, the combination with a wheeled frame, of cutting apparatus carried by the forward part of the frame and provided with means for guiding the vines rearward, an upwardly and rearwardly inclined fingered conveyer located in rear of the blades, a cross-bar carried by and hung below the lower portion of the frame of the conveyer, guard members located above the conveyer and at opposite sides of the respective fingers thereof and adapted to lift the vines therefrom, the lower ends of the guard members being bowed around and extended in rear of the lower end of the conveyer, and upwardly-rounded guards or guides carried by the cross-bar and located in the path of the lower section of the conveyer to carry the same over the cross-bar.

8. In a harvesting-machine of the character described, the combination with a main wheeled frame, of cutting apparatus carried by the forward portion thereof and provided with means for guiding the vines rearward, a conveyer located in rear of the cutting apparatus and comprising opposite upwardly and rearwardly inclined side bars within the main frame, brackets connecting the side bars to the frame, upper and lower shafts connecting the corresponding ends of the side bars, sprocket-wheels upon said shafts, a drive connection between one of the shafts and one of the supporting-wheels of the machine, sprocket-chains traveling over the corresponding sprocket-wheels, fingered slats connecting the sprocket-chains, a cross-bar located below and hung from the opposite side bars of the conveyer-frame, a plurality of guard-slats located above the conveyer and disposed at opposite sides of the upper fingers thereof, the lower ends of the guard-slats being extended around and in rear of the lower shaft and connected to the cross-bar, opposite upwardly-bowed spring-guides carried by the cross-bar and located in the path of the under section of the conveyer to carry the same over the cross-bar.

9. In a harvesting-machine of the character described, the combination with a main frame, of cutting apparatus carried by the forward part thereof, means for guiding the vines rearward, brackets carried by the rear end of the frame and having corresponding upper and lower bearings, an upwardly and rearwardly inclined conveyer located in rear of the cutting apparatus and having its upper shaft journaled in the upper bearings of the brackets, a vertically-tilted bundle former and discharger journaled in the lower bearings of the brackets, and means for tilting the bundle-former upon its bearings.

10. In a harvesting-machine of the character described, the combination with a wheeled frame, of cutting apparatus carried by the forward portion thereof, means for guiding the vines rearward, vertically-disposed brackets carried by the rear end of the frame and having corresponding upper and lower bearings, an upwardly and rearwardly inclined conveyer located in rear of the cutting apparatus and having its upper shaft journaled in the corresponding upper bearings of the brackets, a bundle former and discharger comprising a rocking cross-head, tines or fingers carried by and projected rearwardly therefrom, opposite hinge-brackets carried by the cross-head and provided with journals mounted in the respective lower bearings of the first-mentioned brackets, one of the hinge-brackets also having a member projected forwardly across the under side of the cross-head, controlling means mounted upon the frame, and an operative connection between said means and the forwardly-directed part of the said hinge-bracket.

11. In a harvesting-machine of the character described, the combination with a main wheeled frame, of a vertically-tilting frame hinged thereto, means for cutting the vines from the ground carried by the forward portion of the tilting frame and provided with means for guiding the vines rearward, means for raising and lowering the tilting frame, an upwardly and rearwardly inclined conveyer mounted rigidly upon the main frame in rear of the cutting means and independent of the tilting frame to carry away from the cutting means the material cut thereby, a tiltable bundle former and discharger also mounted on the main frame in rear of the conveyer to receive the discharge therefrom, and means for tilting the bundle-former to deposit its contents in bundles upon the ground.

12. In a harvesting-machine of the character described, the combination with opposite standards, of rearwardly-converging blades carried by the standards, upwardly and rearwardly bowed guards or fenders carried by and rising from the forward ends of the blades and secured at their lower terminals to the same, and conveying means of greater width than the space between the rear ends of the blades for carrying the vines upward from the ground.

13. In a harvesting-machine of the character described, the combination with a wheeled frame, of cutting apparatus carried by the front of the frame, means for guiding the vines rearward, an upwardly and rearwardly inclined fingered conveyer located in rear of the knives, upwardly and rearwardly inclined guard members lying above the conveyer and at opposite sides of the respective fingers thereof, the upper ends of the guard members being bowed over the upper end of the conveyer and the rear end of the frame of the machine for lifting the vines from the fingers, and bundle forming and dumping means carried by the main frame and located in rear of the conveyer to receive material therefrom.

14. In a harvesting-machine of the character described, the combination with a wheeled frame, of cutting apparatus, means for guiding the vines rearward, an upwardly and rearwardly inclined fingered conveyer located in rear of the cutting apparatus, upwardly and rearwardly inclined guard members lying above the conveyer at opposite sides of the respective fingers thereof with their upper ends bowed over the tops of the uppermost fingers and projected in rear of the top of the conveyer and the rear end of the frame to lift the vines clear of the fingers, and bundle forming and dumping means carried by and projected in rear of the frame and disposed to receive the discharge from the rear ends of the guards.

15. In a harvesting-machine of the character described, the combination with a frame, of cutting apparatus, means for guiding the vines rearward, a conveyer located in rear of the cutting apparatus, and a bundle forming and dumping device carried by the frame in rear of the conveyer and comprising a substantially horizontal transverse rocking cross-bar, substantially horizontal fingers carried by the cross-bar and projected outwardly in rear of the frame, and means for rocking the bar to tilt the fingers downwardly and thereby dump the bundles rearwardly and away from the machine.

16. In a harvesting-machine of the character described, the combination with a frame, of cutting apparatus, means for guiding the vines rearward, a conveyer located in rear of the cutting apparatus, and a bundle forming and dumping device disposed to receive the discharge from the conveyer, with the discharge end of the dumping device extended rearwardly from the frame, and means to tilt the rear end of the dumping device downwardly and forwardly to discharge its contents rearwardly from the machine.

17. In a harvesting-machine of the character described, the combination with a frame, cutting mechanism arranged at the front of the frame, and conveying means for carrying the material upward from the ground, of a bundle forming and discharging device comprising a transversely-disposed substantially horizontal rocking cross-head hinged to the rear portion of the frame, and rearwardly-extending substantially horizontal fingers carried by the cross-head, a controlling device mounted upon the frame of the machine, and a connection between the controlling device and the cross-head to rock the same for tilting the bundle-forming device.

18. In a harvesting-machine of the character described, the combination of a frame, cutting mechanism, an upwardly and rearwardly inclined fingered conveyer for carrying the material from the cutting mechanism, upwardly and rearwardly inclined guard members lying above the conveyer at opposite sides of the fingers, the upper ends of the guard members being bowed over the tops of the fingers at the upper end of the conveyer to lift the vines from the fingers and the rear end of the frame of the machine.

19. In a harvesting-machine of the character described, the combination of a frame, cutting mechanism, an upwardly and rearwardly inclined fingered conveyer for carrying the material from the cutting mechanism, a cross-bar carried by and hung below the lower portion of the frame of the conveyer, guard members located above the conveyer at opposite sides of the fingers to lift the vines therefrom, the lower end of the guard members being bowed around and extending in rear of the lower end of the conveyer and connected to the cross-bar, and upwardly-rounded guards or guides carried by the cross-bar and located in the path of the lower section of the conveyer to carry the same over the cross-bar.

20. In a harvesting-machine of the character described, the combination of a frame, cutting mechanism, an upwardly and rearwardly inclined fingered conveyer for carrying the material from the cutting mechanism, a cross-bar carried by and hung below the lower portion of the frame of the conveyer, and upwardly and rearwardly inclined guard members lying above the conveyer at opposite sides of the fingers, the lower ends of the guard members being bowed around and extending in rear of the lower end of the conveyer and connected to the cross-bar, and the upper ends of the guard members being bowed over the tops of the fingers at the upper end of the conveyer to lift the vines from the fingers and the rear end of the frame of the machine.

In testimony that I claim the foregoing as my own I have hereto affixed my signature in the presence of two witnesses.

CHARLES BAER.

Witnesses:
ALFRED BODIN,
EDW. F. HACKMAN.